US006805655B2

United States Patent
Hori et al.

(10) Patent No.: US 6,805,655 B2
(45) Date of Patent: Oct. 19, 2004

(54) OIL PRESSURE CONTROL MECHANISM FOR AUTOMATIC TRANSMISSION

(75) Inventors: Yoshiaki Hori, Saitama (JP); Yoshihiro Yoshida, Saitama (JP); Seiji Hamaoka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/283,201

(22) Filed: Oct. 30, 2002

(65) Prior Publication Data

US 2003/0130089 A1 Jul. 10, 2003

(30) Foreign Application Priority Data

Nov. 1, 2001 (JP) ........................................ 2001-336510

(51) Int. Cl.[7] .............................................. F16H 59/30
(52) U.S. Cl. ........................ 477/121; 477/131; 477/138; 477/164
(58) Field of Search ................................ 477/121, 117, 477/123, 127, 130, 131, 138, 155, 156, 164

(56) References Cited

U.S. PATENT DOCUMENTS 4,643,049 A * 2/1987 Nishikawa et al. ......... 477/114
4,850,251 A * 7/1989 Kuwayama et al. ........ 477/114
5,951,616 A * 9/1999 Chiba et al. .................. 701/58

FOREIGN PATENT DOCUMENTS

JP           49-5772        *  2/1974

* cited by examiner

Primary Examiner—Tisha Lewis
(74) Attorney, Agent, or Firm—Birch, Stewart, Kolasch & Birch, LLP

(57) ABSTRACT

Many vehicles designed for running on rough terrain include an automatic transmission for performing speed change by connecting or disconnecting an oil hydraulic clutch provided alongside each speed change gear. However, depending on the posture of the driver, it may be impossible to step on the brake. As a result, it may be impossible to achieve creep prevention with a creep preventive mechanism dependent on a brake signal. Therefore, a creep preventive mechanism which operates independently from a brake signal is required. The present invention provides an oil pressure control system operating independently from a brake signal. The system includes an oil pressure supply source with a linear solenoid valve for supplying working oil or interrupting the supply of the working oil to the oil hydraulic clutches. The supply of the working oil to the clutches is interrupted when the vehicle is stopped under an idling condition of an engine.

16 Claims, 16 Drawing Sheets

SOLENOID OPERATION TABLE

| | FIRST-SECOND GEAR POSITION CHANGEOVER SOLENOID (116) | SECOND-THIRD GEAR POSITION CHANGEOVER SOLENOID (118) | LINEAR SOLENOID VALVE (114) | DRAWING |
|---|---|---|---|---|
| NEUTRAL GEAR POSITION | OFF | OFF | ON | FIG. 11 |
| FIRST GEAR POSITION | ON | OFF | OFF/ON | FIG. 12/ FIG. 13 |
| SECOND GEAR POSITION | OFF | OFF | OFF | FIG. 14 |
| THIRD GEAR POSITION | OFF | ON | OFF | FIG. 15 |
| BACK GEAR POSITION | ON | OFF | OFF/ON | FIG. 12/ FIG. 13 |

OIL PRESSURE CONTROL MECHANISM FOR AUTOMATIC TRANSMISSION

CROSS-REFERENCE TO RELATED APPLICATION

The present application claims priority under 35 U.S.C. §119 to Japanese Patent Application No. 2001-336510 filed on Nov. 1, 2001, the entire contents of which are hereby incorporated by reference.

BACKGROUND OF THE INVENTION

1. Field of the Invention

The present invention relates to an oil pressure control system for automatic transmission of a saddle ride type four-wheel vehicle (buggy car) for running on rough terrain.

2. Description of Background Art

An automatic transmission of a general four-wheel vehicle, in most cases, does not have a mechanical neutrality maintaining mechanism, and interruption of transmission of power is effected by releasing the connection of a clutch. In the case where an oil hydraulic clutch is used, a primary oil pressure is disconnected forcibly by a manual valve. As for creep preventive control, for improvement of power consumption, a system is used in which the oil pressure of the clutch is interrupted based on a brake signal when a brake is applied, only for the first gear position, so that creep is generated when the control mechanism is in trouble. Where it becomes impossible to start the vehicle under a creep preventive condition, running at another position is possible.

In the case of a vehicle expected to be used on rough terrain, depending on the posture of the driver, it may be impossible to step on the brake, and thus it may be impossible to prevent creep with a creep preventive mechanism dependent on a brake signal. Therefore, a creep preventive mechanism which acts independently of a brake signal is required.

In addition, in the case where it becomes impossible to start the vehicle under a creep preventive condition, it is necessary to start from another position, so that a creep preventive mechanism only for the first clutch position is unsatisfactory.

SUMMARY AND OBJECTS OF THE INVENTION

The present invention has solved the above-mentioned problems.

A first aspect of the present invention is based on an oil pressure control system for automatic transmission for performing speed change by connection and disconnection of an oil hydraulic clutch provided alongside each speed change gear, wherein an oil pressure supply source for the oil hydraulic clutch is provided with a linear solenoid valve for supplying a working oil and interrupting the supply of the working oil, and the supply of the working oil to the clutch is interrupted when an internal combustion engine is in an idling condition and a vehicle is at stop.

According to this first aspect of the present invention, prevention of creep can be effected under all clutch conditions, and a neutral condition can be obtained by interrupting the supply of the working oil under a stand-by condition for starting (an idling stopped condition).

A second aspect of the present invention is based the oil pressure control system for automatic transmission, wherein the linear solenoid valve supplies the working oil when a power source is OFF, and interrupts the supply of the working oil when the power source is ON.

According to this second aspect of the present invention, since the power source is OFF during running, the problem of having running being impossible due to failure of the linear solenoid valve during running can be prevented.

A third aspect of the present invention is based on the oil pressure control system for automatic transmission, wherein the linear solenoid valve increases gradually the amount of the working oil supplied to the clutch, with increases in throttle opening and engine revolution frequency as parameters.

According to this third aspect of the present invention, abrupt starting due to abrupt connection of the clutch can be prevented.

A fourth aspect of the present invention is based on the oil pressure control system for automatic transmission, wherein the linear solenoid valve is provided with a communication passage for equalizing the pressure of the working oil supplied to the clutch and the oil pressure on the back side of the valve. The pressure of the working oil and the oil pressure on the back side of the valve are equalized when the working oil is supplied, and the pressure on the back side of the valve is released when the supply of the working oil is interrupted.

According to this fourth aspect of the present invention, when the output oil pressure is increased due to the balance of the thrust force of the solenoid and the pressure on the back side of the valve, the pressure on the back side of the valve is also simultaneously increased to close the valve, whereby the oil pressure is disconnected. With the oil pressure disconnected, the pressure on the back side of the valve is lowered, so that the valve is opened. These actions are repeated, whereby a constant oil pressure is outputted.

In addition to this, the thrust force of the solenoid is varied by a current value, whereby the output oil pressure can be varied linearly. By this, it is possible to gradually increase the pressure of the working oil that is supplied to the clutch.

A fifth aspect of the present invention is based on the oil pressure control system for automatic transmission, wherein a manual type emergency valve capable of forming an oil passage bypassing the linear solenoid valve is provided on the side of a discharge port of the linear solenoid valve.

According to this fifth aspect of the present invention, it becomes possible to start the vehicle even when a stop or failure has occurred under the condition where the linear solenoid valve is interrupting the supply of the working oil.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9(a) shows an enlarged sectional view of a linear solenoid valve when the power source is OFF, and FIG. 9 (b) shows an enlarged sectional view of a linear solenoid when the power source is ON;

FIG. 10 is an operation table of the solenoids of the present invention;

DETAILED DESCRIPTION OF THE PREFERRED EMBODIMENTS

Figure 1:
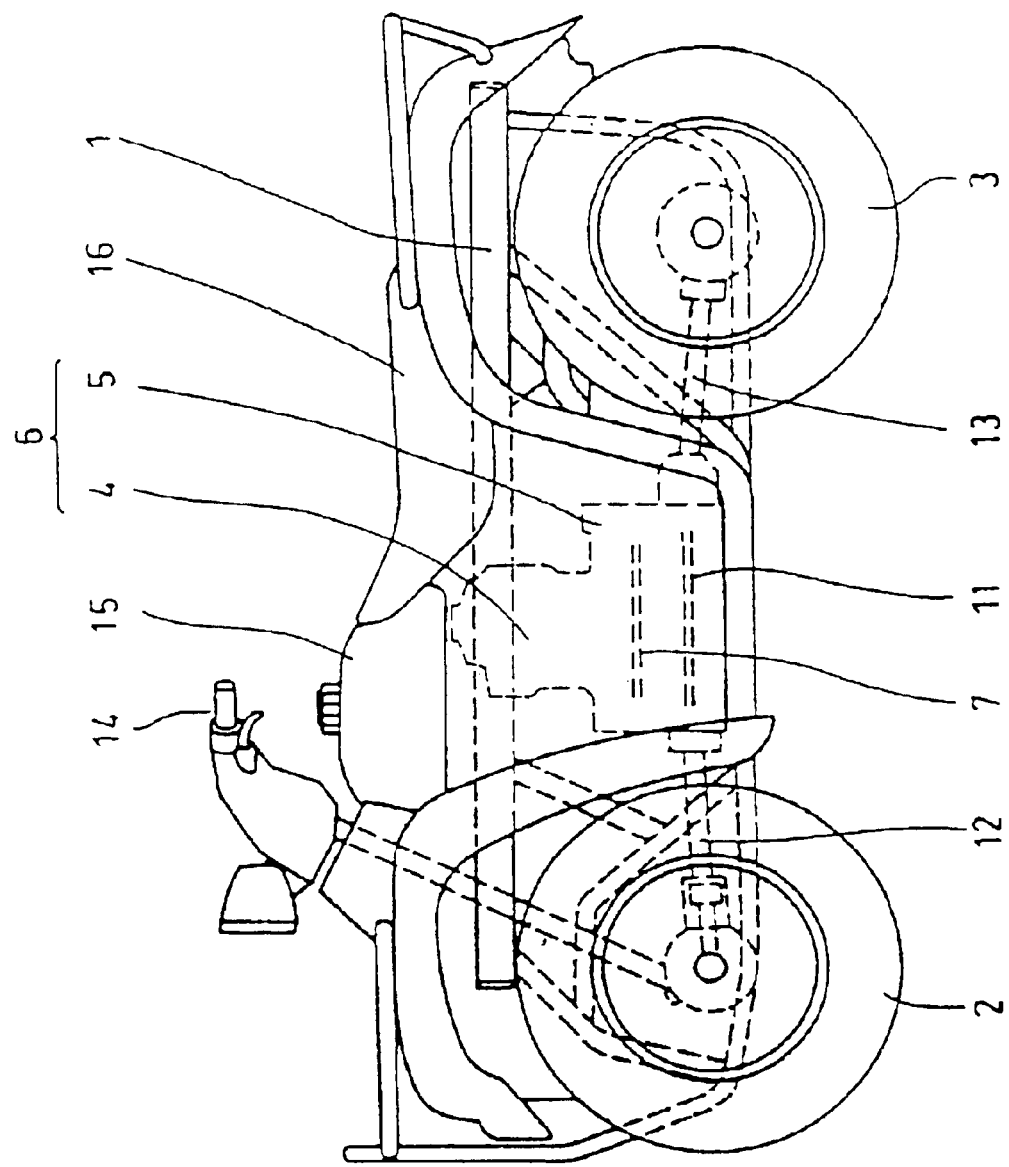
FIG. 1 is a side view of a four-wheel buggy car (saddle ride type vehicle for running on rough terrain) on which an internal combustion engine is mounted.

FIG. 1 is a side view of a four-wheel buggy car (saddle ride type vehicle for running on wasteland) on which an internal combustion engine with an oil hydraulic type automatic transmission according to the present invention is mounted. The buggy car has a structure in which left-right pairs of front wheels 2 and rear wheels 3 are provided respectively at front and rear portions of a vehicle body frame 1, and a power unit 6 integrally constituting an internal combustion engine 4 and a transmission 5 is supported on a central portion of the vehicle body frame 1.

The power unit 6 is disposed with a crankshaft 7 directed in the front-rear direction of the vehicle body. The rotation of the crankshaft 7 is transmitted through a main shaft 8, a counter shaft 9, and an intermediate shaft 10 (all shown in FIG. 4) of the transmission to an output shaft 11. These shafts are all parallel to the crankshaft, and are disposed in the front-rear direction of the vehicle body. The front wheels 2 are driven by a front wheel drive shaft 12 connected to the front end of the output shaft 11, while the rear wheels 3 are driven by a rear wheel drive shaft 13 connected to the rear end of the output shaft 11. A steering handle 14, a fuel tank 15, and a saddle type seat 16 are provided, in this order from the front side, at upper portions of the vehicle body.

Figure 2:
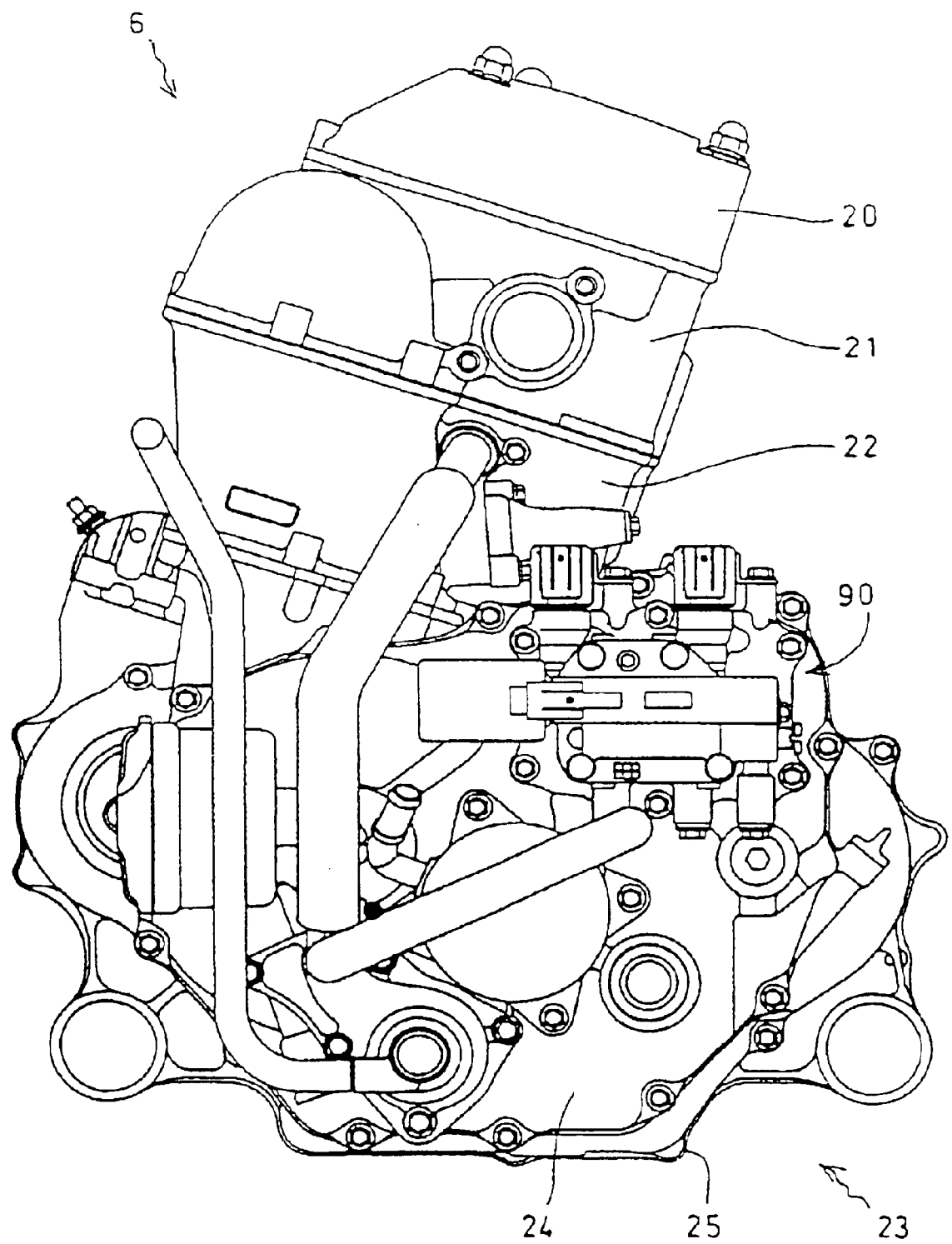
FIG. 2 is a front view of a power unit according to the present invention.

FIG. 2 is a front view of the power unit 6 according to the present invention, in which the front surface of the power unit 6 is viewed from the front side. A main body portion of the power unit 6 is generally composed of four portions, namely, a cylinder head cover 20, a cylinder head 21, a cylinder block 22, and a crankcase 23, in this order from the upper side. In addition, the crankcase 23 is divided in a plane orthogonal to the crankshaft 7 into four portions, which forming of a front crankcase cover 24, a front crankcase 25, a rear crankcase 26, and a rear crankcase cover 27 (these are partially shown in FIGS. 5 and 6), in this order from the front side.

Figure 3:
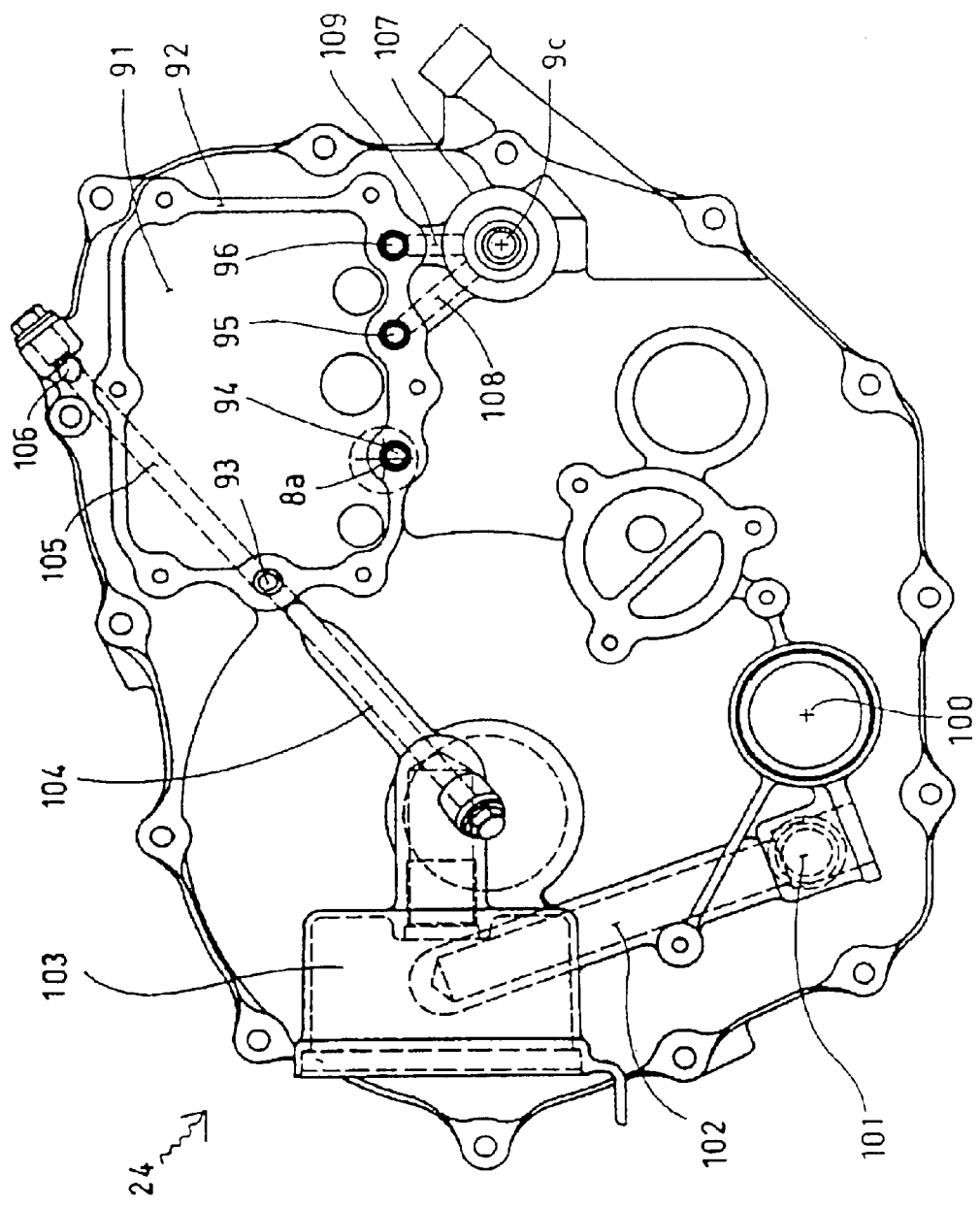
FIG. 3 is a view of a front crankcase cover from the front side.

In FIG. 2, the front crankcase cover 24 is seen, and the front crankcase 25 is a little seen in the surroundings thereof. Various equipments and piping are fitted to a front surface of the front crankcase cover 24. FIG. 3 is a view of only the front crankcase cover 24 from the front side, and FIG. 4 is a view of the front crankcase 25 from the front side.

Figure 4:
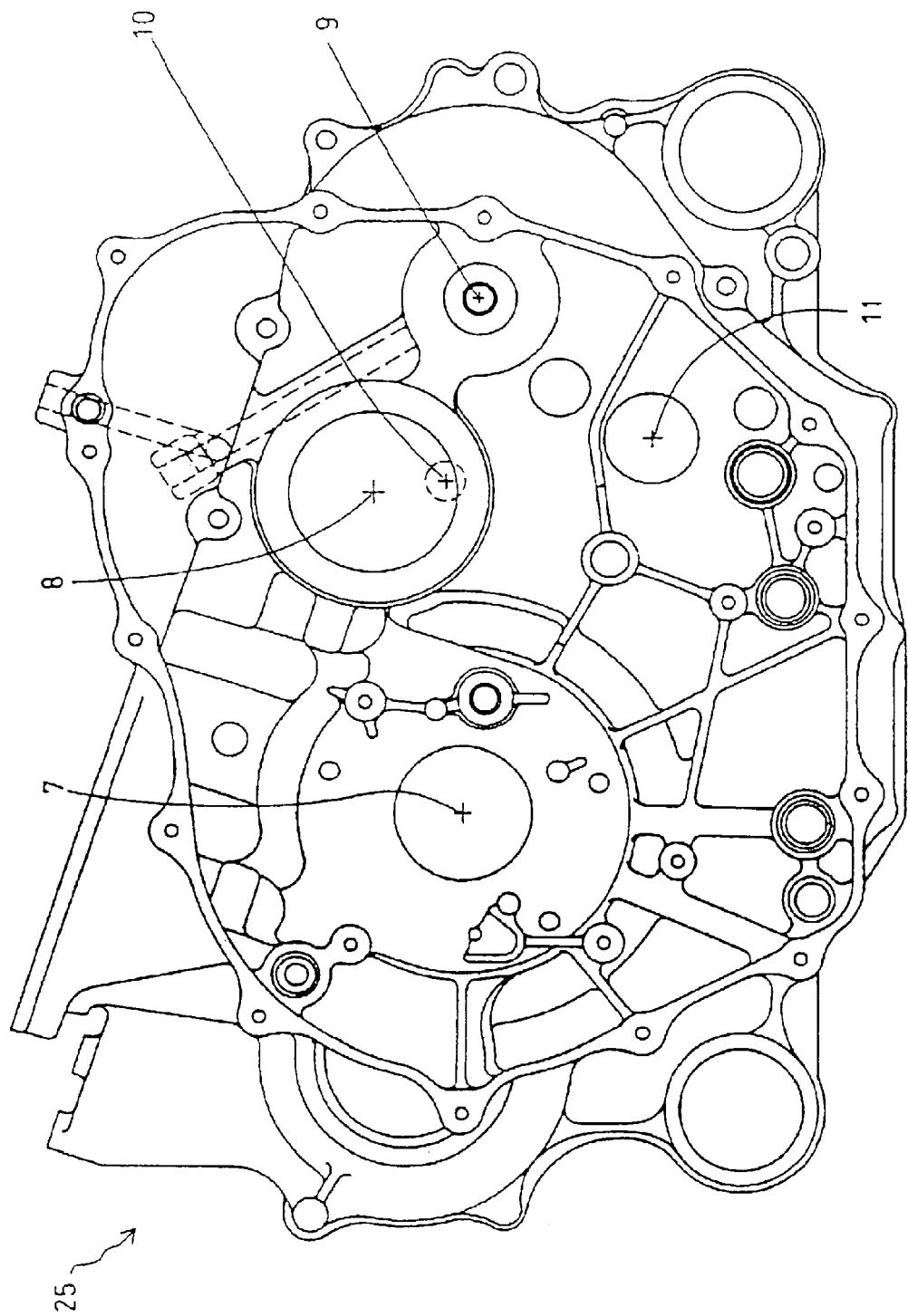
FIG. 4 is a view of a front crankcase from the front side.
Figure 5:
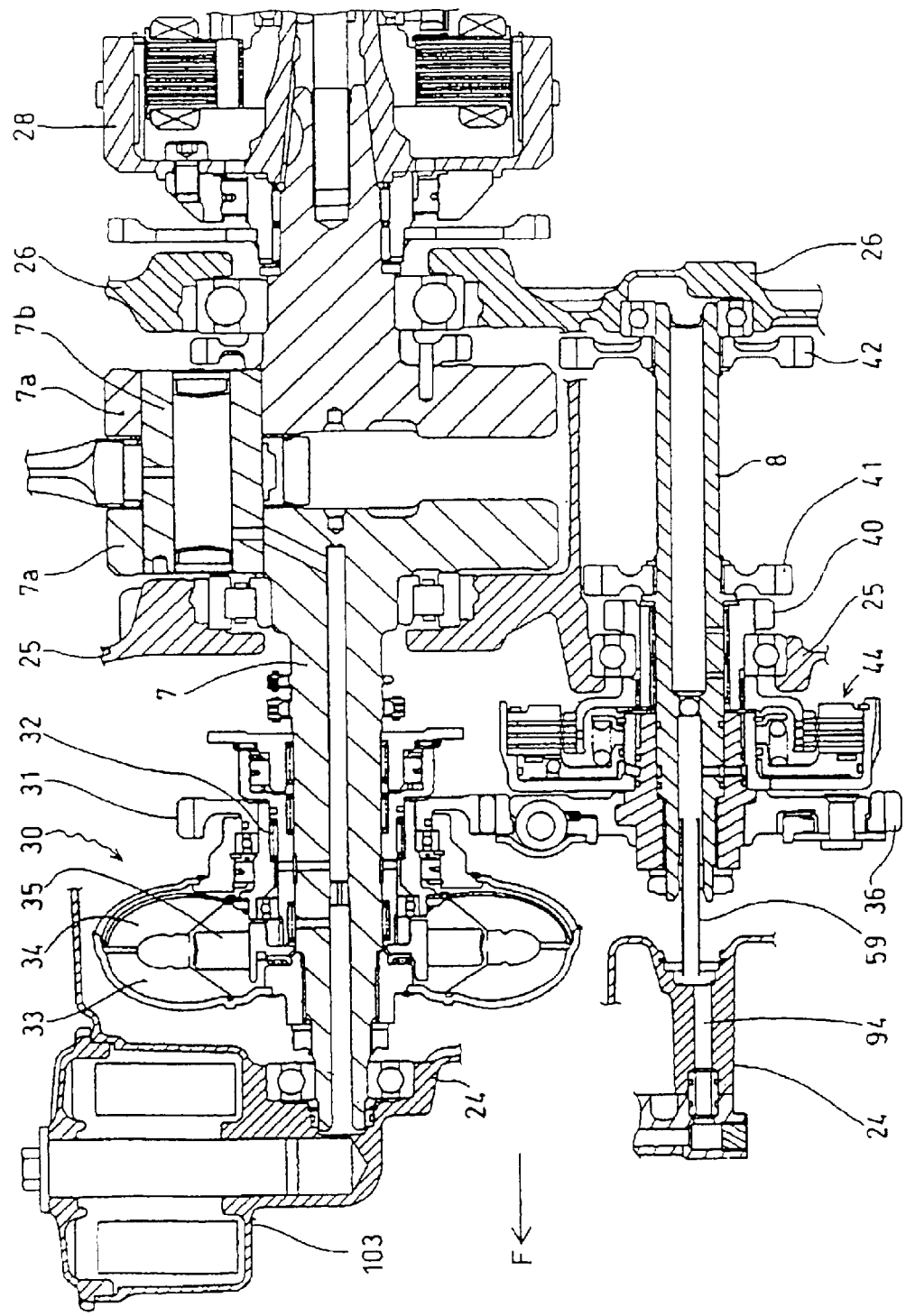
FIG. 5 is a vertical sectional view of the inside of a crankcase, showing the relationship between a crankshaft and a main shaft.
Figure 6:
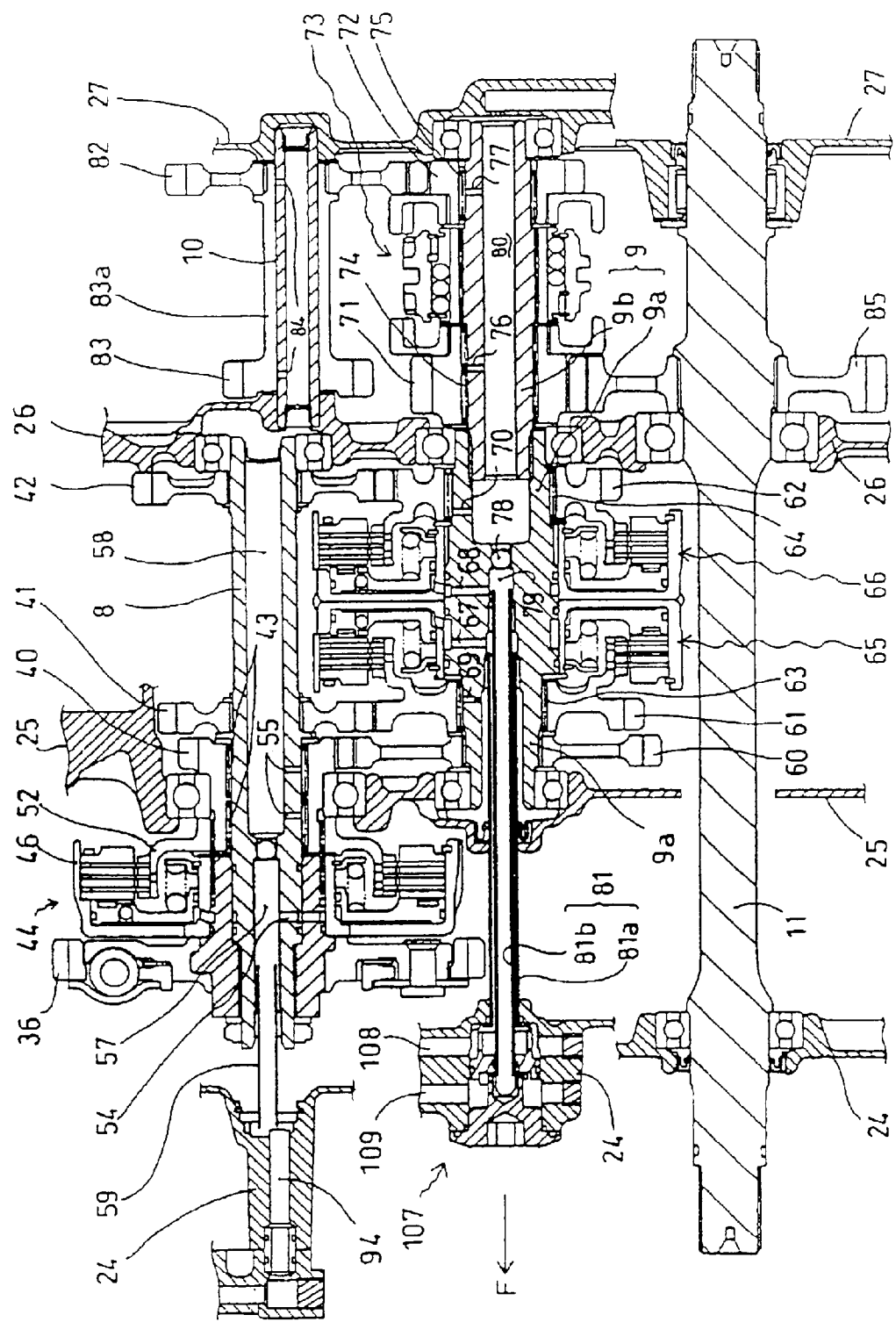
FIG. 6 is a vertical sectional view of the inside of the crankcase, showing the relationship among the main shaft, a counter shaft, an intermediate shaft, and an output shaft.

FIG. 4 shows the positions of the crankshaft 7, the main shaft 8, the counter shaft 9, the intermediate shaft 10, and the output shaft 11 of the transmission. FIGS. 5 and 6 are vertical sectional views of the inside of the crankcase passing through main shafts in the crankcase, in which FIG. 5 shows the relationship between the crankshaft 7 and the main shaft 8, and FIG. 6 shows the relationship among the main shaft 8, the counter shaft 9, the intermediate shaft 10, and the output shaft 11. In these figures, arrow F indicates the front or forward direction.

FIG. 5 shows a power transmission mechanism between the crankshaft 7 and the main shaft 8. The crankshaft 7 is supported on the front and rear crankcases 25 and 26 through bearings. A front extended portion of the crankshaft 7 is supported on the front crankcase cover 24 through a bearing. The crankshaft 7 is divided into front and rear portions, which are connected by a crank pin 7b at a crank web 7a. An AC generator 28 for generating power by rotation of the crankshaft 7 is fitted to the rear end of the crankshaft 7.

The crankshaft 7 is provided with a primary driving gear 31 through a torque converter 30. The primary driving gear 31 is rotatably supported on the crankshaft 7 through a needle bearing 32. The torque converter 30 includes a pump impeller 33 fixed to the crankshaft 7, a turbine runner 34 opposed thereto, and a stator 35. The primary driving gear 31 rotatable in relation to the crankshaft 7 is connected to the turbine runner 34, and power from the crankshaft 7 is transmitted to the primary driving gear 31 through the working oil. A primary driven gear 36 constantly meshed with the primary driving gear 31 is fixed to a front end portion of the main shaft 8 of the transmission. The rotation of the crankshaft 7 is transmitted to the main shaft 8 through primary speed reduction performed by the primary driving gear 31 and the primary driven gear 36.

FIG. 6 shows a power transmission mechanism among the main shaft 8, the counter shaft 9, the intermediate shaft 10, and the output shaft 11 of the transmission. The main shaft 8 of the transmission is supported on the front and rear crankcases 25 and 26 through bearings. The main shaft 8 is provided with a first gear position driving gear 40, a second gear position driving gear 41, and a third gear position driving gear 42, which differ in the number of teeth according to speed reduction ratios. The second gear position driving gear 41 and the third gear position driving gear 42 are fixed gears, which are fixed on the main shaft 8, while the first gear position driving gear 40 is rotatably supported on the main shaft 8 through a needle bearing 43.

In the description below, generally, a gear rotatably supported on a rotary shaft through a needle bearing is called a floating gear. A first gear position oil hydraulic type multiple disk clutch 44 is intermediately provided between the main shaft 8 and the first gear position driving gear 40.

Figure 7:
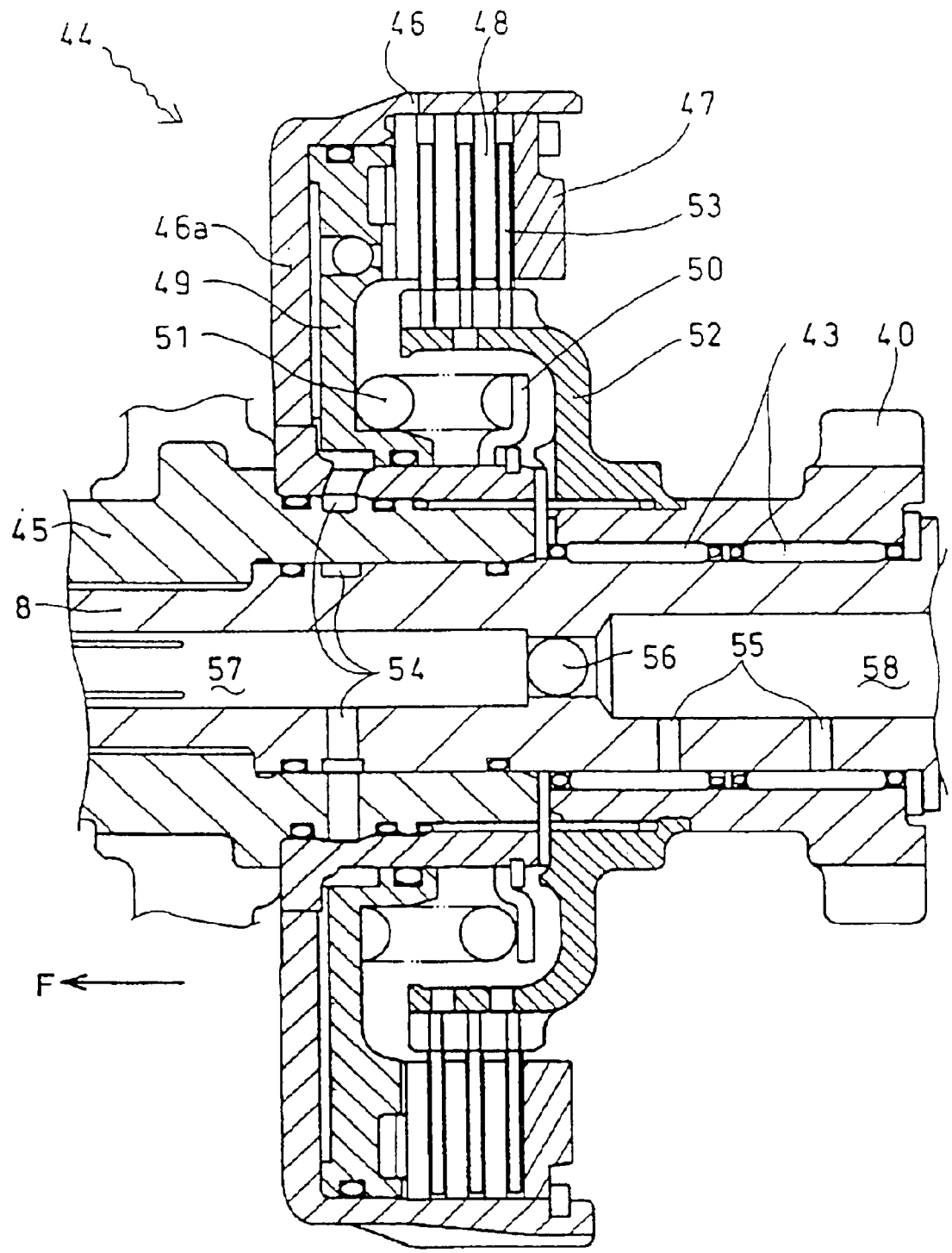
FIG. 7 is an enlarged sectional view for illustrating the constitution and actions of a first gear position oil hydraulic type multiple disk clutch and a first gear position driving gear.

FIG. 7 is an enlarged sectional view for illustrating the constitution and actions of the first gear position oil hydraulic type multiple disk clutch 44 and the first gear position driving gear 40. The first gear position oil hydraulic type multiple disk clutch 44 is composed of a vessel form clutch outer 46 fixed to the main shaft 8 through an outer cylinder 45, an annular stopper 47 fixed to an open end of the clutch outer 46, outside clutch disks 48 held on an inner peripheral surface of the clutch outer through splines so as to be displaceable in the axial direction, a pressure plate 49 fitted in a piston form adjacently to a bottom wall portion 46a of the clutch outer 46, and a coil spring 51 provided between a locking portion 50 provided on the clutch outer 46 and the pressure plate 49 for pressing the pressure plate 49 toward the bottom wall portion 46a of the clutch outer 46. Also included are a clutch inner 52 fitted integrally to the first gear position driving gear 40, inside clutch disks 53 held on an outer peripheral surface of the clutch inner 52 through splines so as to be displaceable in the axial direction and arranged alternately with the outside clutch disks 48, a working oil supply hole 54 in the first oil hydraulic type multiple disk clutch 44 provided so as to connect the main shaft 8, the outer cylinder 45, and the clutch outer 46, and a lubricating oil supply hole 55 for the needle bearing 43 for the first gear position driving gear 40. The main shaft 8 is provided with a center hole with an inside diameter varied steppedly on the center line thereof, and a steel ball 56 is press fitted in the narrowest portion of the center hole, whereby the center hole is partitioned into a front portion center hole 57 and a rear portion center hole 58.

As shown in FIG. 6, the working oil for the clutch 44 is fed from the side of the front crankcase cover 24 to the front portion center hole 57 through a working oil supply pipe 59, and is supplied to the clutch 44 through the working oil supply hole 54.

As shown in FIG. 7, the working oil comes between the bottom wall portion 46a of the clutch outer 46 and the pressure plate 49, the oil pressure causes the pressure plate 49 to move against an energizing force of the coil spring 51, the inside and outside clutch disks are pressed in the axial direction, and the outside clutch disks 48 restricts the movement of the inside clutch disks 53. By this, the clutch inner 52 is integrated with the clutch outer 46, the first gear position driving gear 40 comes not to float but is fixed to the main shaft 8, and the rotation of the main shaft 8 is transmitted to the first gear position driving gear 40. A lubricating oil for the needle bearing 43, which bears the first gear position driving gear 40, is supplied from the side of the rear portion center hole 58 through the lubricating oil supply hole 55.

The counter shaft 9 composes a front portion counter shaft 9a and a rear portion counter shaft 9b, which are integrated with each other to form the counter shaft 9. The counter shaft 9 is supported on the front crankcase 25, the rear crankcase 26, and the rear crankcase cover 27 through bearings. The front portion counter shaft 9a is provided with a first gear position driven gear 60, a second gear position driven gear 61, and a third gear position driven gear 62, which are constantly meshed respectively with the first gear position driving gear 40, the second gear position driving gear 41, and the third gear position driving gear 42 on the main shaft 8.

The first gear position driven gear 60 is a fixed gear fixed to a shaft, while the second gear position driven gear 61 and the third gear position driven gear 62 are floating gears, which are supported rotatably in relation to the counter shaft 9 through needle bearings 63 and 64 respectively. A second gear position oil hydraulic type multiple disk clutch 65 and a third gear position oil hydraulic type multiple disk clutch 66 are intermediately provided between the counter shaft 9 and these floating gears, respectively. In these clutches, a clutch outer is fixed to the counter shaft 9, and a clutch inner is connected to the floating gear. The constitution and actions of these clutches are the same as those of the above-mentioned first gear position oil hydraulic type multiple disk clutch 44. Therefore, detailed description thereof is omitted.

Also in these clutches, a working oil is supplied through working oil supply holes 67 and 68 formed in the counter shaft, whereby floating of the floating gears is stopped, to enable transmission of power, thereby performing speed reduction at the second gear position or the third gear position. Lubricating oil supply holes 69 and 70 leading to the needle bearings 63 and 64 for bearing the second gear position driven gear 61 and the third gear position driven gear 62 are also formed in the counter shaft 9.

The rear portion counter shaft 9b is provided with a forward rotation driving gear 71 and a reverse rotation driving gear 72. These are both floating gears, of which the one engaged with a manual dog clutch 73 provided at an intermediate position therebetween is fixed to a shaft, whereby transmission of power is enabled. Lubricating oil supply holes 76 and 77 for supplying a lubricating oil to needle bearings 74 and 75 respectively bearing the forward rotation driving gear 71 and the reverse rotation driving gear 72 are formed in the rear portion counter shaft 9b.

The counter shaft 9 composed of the front portion counter shaft 9a and the rear portion counter shaft 9b integrated with each other is provided with a center hole, which is partitioned into a front portion center hole 79 and a rear portion center hole 80 by a steel ball 78 press fitted in a narrowest portion thereof. The supply of a working oil to the second and third gear position oil hydraulic type multiple disk clutches 65 and 66 is conducted from the side of the front crankcase cover 24 through a double-wall pipe 81. The double-wall pipe 81 composed of an outer pipe 81a and an inner pipe 81b.

The working oil for the second gear position oil hydraulic type multiple disk clutch 65 is supplied through an oil passage between the outer pipe 81a and the inner pipe 81b and through the working oil supply hole 67. The working oil for the third gear position oil hydraulic type multiple disk clutch 66 is supplied through an oil passage inside the inner pipe 81b and the working oil supply hole 68.

The working oil for the needle bearing 63 for the second gear position driven gear 61 is supplied from the side of the front crankcase 25 through an oil passage between the front portion counter shaft 9a and the outer pipe 81a and through the lubricating oil supply hole 69. The working oil supplied to the needle bearings 64, 74, and 75 for the third gear position driven gear 62, the forward rotation driving gear 71, and the reverse rotation driving gear 72 is supplied from the side of the rear crankcase cover 27 through the rear portion center hole 80 of the counter shaft 9 and the lubricating oil supply holes 70, 76, and 77.

The intermediate shaft 10 is supported on the rear crankcase 26 and the rear crankcase cover 27. A first intermediate gear 82 constantly meshed with the reverse rotation driving gear 72 and a second intermediate gear 83 connected to the first intermediate gear 82 through a long sleeve portion 83a are rotatably held on the intermediate shaft 10. A lubricating oil for sliding portions of the first intermediate gear 82 and the second intermediate gear 83 for sliding in relation to the intermediate shaft 10 is supplied from the rear crankcase 26 through a center hole of the intermediate shaft and a lubricating oil supply hole 84.

The output shaft 11 is supported on the front crankcase cover 24, the rear crankcase 26, and the rear crankcase cover 27 through bearings. The output shaft 11 pierces through the front crankcase 25 without making contact with the front crankcase 25.

An output shaft driven gear 85 constantly meshed with the forward rotation driving gear 71 and the second intermediate gear 83 is fixed onto the output shaft 11. The output shaft driven gear 85 is driven for forward rotation or driven for reverse rotation through the gear with that the dog clutch 73 is engaged, whereby the output shaft 11 is rotated in a direction suitable for forward running or rearward running of the vehicle. Such a control is made that the reverse rotation driving is connected only when the counter shaft 9 is rotating at the first gear position.

The gears in the above-mentioned transmission are all constantly meshed type gears, the speed change ratios of which is determined by which of the oil hydraulic type multiple disk clutches 44, 65, and 66 is put into the connected condition. The oil pressure control for this is performed by a valve body 90 assembled as an integral oil pressure control system by collecting the solenoid valve and oil pressure changeover valves, and the position of the valve body 90 is as shown in FIG. 2; namely, the valve body 90 is fitted to a front surface of the front crankcase cover 24.

The valve body 90 is fitted to a fitting recessed portion 91 of the front crankcase cover 24 shown in FIG. 3, and is fixed to a fitting surface 92 in the surroundings of the fitting recessed portion 91 through a gasket. In the fitted condition, a front half of the valve body 90 is exposed to the exterior of the front crankcase cover 24, and a rear half of the valve body 90 is embedded in the fitting recessed portion 91 of the front crankcase cover 24. The fitting surface 92 of the front crankcase cover 24 is formed to be parallel with parting faces of the crankcase.

Transfer of the working oil between the front crankcase cover 24 and the valve body 90 is performed between a plurality of working oil inlet/outlet ports provided in the fitting surface 92 and a plurality of working oil inlet/outlet ports provided in the fitting surface on the side of the valve body 90 at positions opposed to the former working oil inlet/outlet ports. The gasket intermediately disposed between the fitting surfaces of the valve body 90 and the front crankcase cover 24 is provided with oil passage holes at positions corresponding to the plurality of working oil inlet/outlet ports.

FIG. 3 shows the working oil inlet/outlet ports provided in the valve body fitting surface 92 of the front crankcase cover 24. These are a working oil supply port 93 leading from the front crankcase cover 24 toward the valve body 90, a working oil inlet 94 leading from the valve body 90 toward the first gear position oil hydraulic type multiple disk clutch, a working oil inlet 95 leading from the valve body 90 toward the second gear position oil hydraulic type multiple disk clutch, and a working oil inlet 96 leading from the valve body 90 toward the third gear position oil hydraulic type multiple disk clutch.

FIG. 3 also shows an extension position of a center line 100 of a pump shaft of an oil pump, which is not shown. The oil pump is provided between the front crankcase cover 24 and the front crankcase 25. An oil fed from the oil pump is fed to an oil filter 103 through oil passages 101 and 102 formed in the inside of a wall surface of the front crankcase cover 24. After foreign matter is filtered away from the oil by the filter, the oil is fed out through an oil passage 104, and a portion of the oil is fed through the working oil supply port 93 into the valve body 90. The other portion of the oil is fed out through an oil passage 105 and an oil passage 106 extending orthogonally to the oil passage 105 toward the front crankcase 25, as a working oil for the torque converter or as a lubricating oil for bearing portions.

FIG. 3 also shows an extension position of the center line 8a of the main shaft 8 of the transmission. The working oil fed out to the working oil inlet 94 leading from the valve body 90 toward the first gear position oil hydraulic type multiple disk clutch 44 is fed to the front portion center hole 57 of the main shaft 8 through the working oil supply pipe 59 provided bridgingly from a rear surface of the front crankcase cover 24 to the front portion center hole 57, as shown in FIG. 6, and is supplied to the first gear position oil hydraulic type multiple disk clutch 44.

In addition, FIG. 3 shows an extension position of the center line 9a of the counter shaft 9. This portion of the front crankcase cover 24 is provided with an oil passage connection portion 107, and oil passages 108 and 109 are formed that lead respectively from the working oil inlet 95 leading toward the second gear position oil hydraulic type multiple disk clutch 65 and the working oil inlet 96 leading toward the third gear position oil hydraulic type multiple disk clutch 66 to the oil passage connection portion 107. The working oil fed from the valve body 90 to the working oil inlet 95 or the working oil inlet 96 is fed from the oil passage connection portion 107 to the front portion center hole 79 of the counter shaft 9 through either of the inner and outer passages of the working oil supply double-wall pipe 81 provided bridgingly to the front portion center hole 79, as shown in FIG. 6, and is supplied to the second gear position oil hydraulic type multiple disk clutch 65 or the third gear position oil hydraulic type multiple disk clutch 66.

Figure 8:
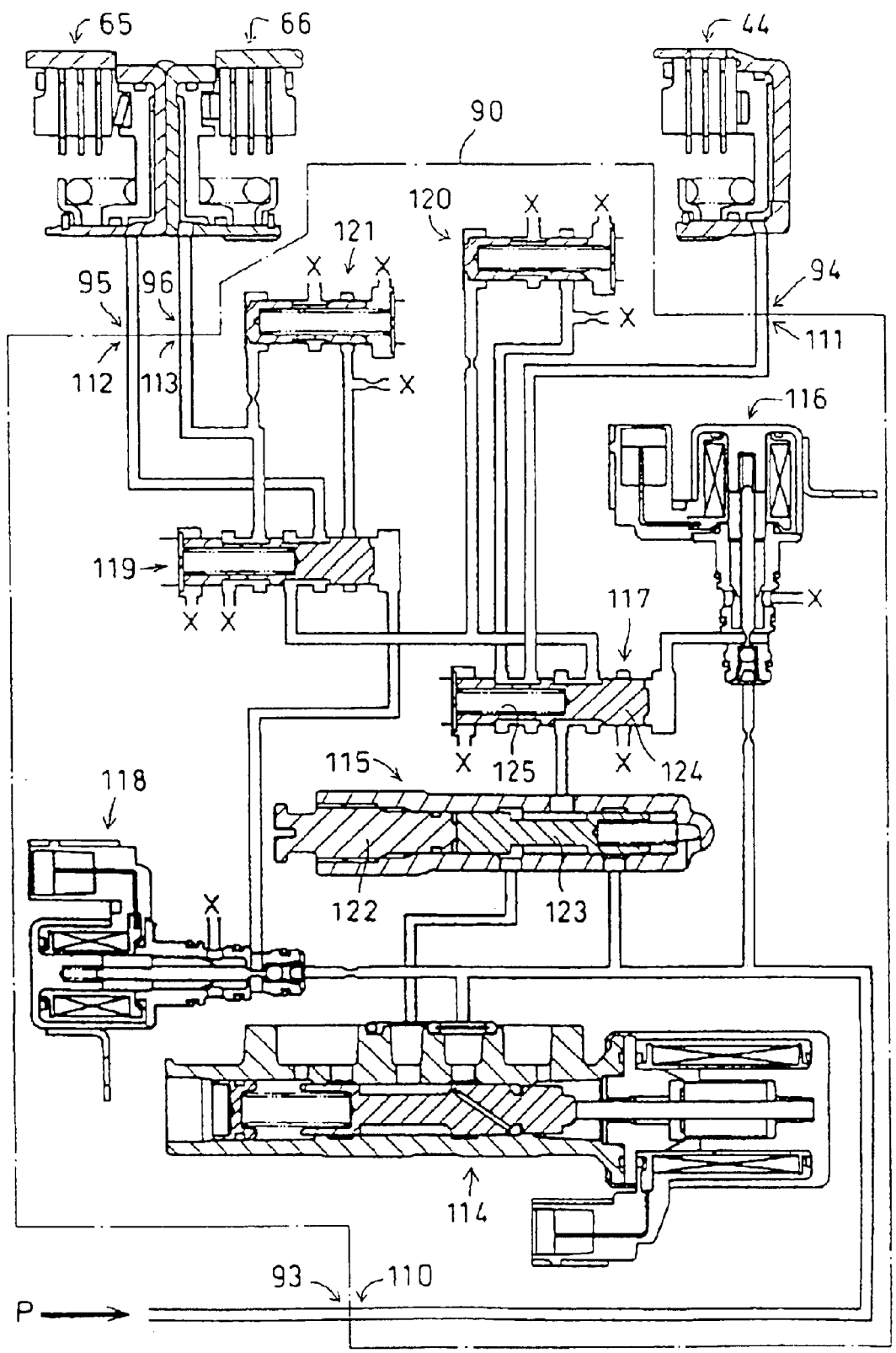
FIG. 8 is an oil pressure control system chart of a valve body.

FIG. 8 is a system chart of the above-mentioned oil hydraulic type multiple disk clutches and an oil pressure control system for controlling them. The portion surrounded by the dot-dash line in the figure is the portion provided in the above-mentioned valve body 90. The working oil is supplied from the working oil supply port 93 leading to the valve body 90 shown in FIG. 3 to a working oil inlet 110 shown in this figure. Arrow P indicates the flow direction of the working oil.

The working oil is controlled in the valve body 90, and the destination of supply is determined. The working oil is supplied to the first gear position oil hydraulic type multiple disk clutch 44 through a working oil outlet 111 and the working oil inlet 94 leading to the first gear position oil hydraulic type multiple disk clutch. The working oil is supplied to the second gear position oil hydraulic type multiple disk clutch 65 through a working oil outlet 112 and the working oil inlet 95 leading to the second gear position oil hydraulic type multiple disk clutch. In a similar manner, working oil is supplied to the third gear position oil hydraulic type multiple disk clutch 66 through a working oil outlet 113 and the working oil inlet 96 leading to the third gear position oil hydraulic type multiple disk clutch. The positions of the working oil inlets 94, 95, and 96 are shown in FIG. 3.

In FIG. 8, a linear solenoid valve 114 is a valve for controlling the supply and the interruption of the supply of the working oil in the direction of an emergency valve 115, and has the function of gradually increasing the amount of the working oil supplied, in an intermediate process ranging from an interruption condition to a full supply condition. The solenoid valve 114 supplies the working oil when a power source is OFF, and interrupts the working oil when the power source is ON.

In normal circumstances, the emergency valve 115 simply provides an oil passage for the working oil leading from the linear solenoid valve 114 toward a first-second gear position changeover valve 117. When a failure or stoppage occurs in the condition where a spool of the linear solenoid valve 114 interrupts the working oil, it would be impossible to start the vehicle. To avoid this situation, the emergency valve 115 forms an oil passage that bypasses the linear solenoid valve 114 so as to supply the working oil toward the first-second gear position changeover valve 117. Upon the failure and stoppage of the linear solenoid valve 114, a spool presser screw 112 is manually screwed in, to push a spool 123 into the inside, thereby forming the bypass oil passage.

A first-second gear position changeover solenoid 116 is a valve for connection/disconnection of an oil pressure for driving a spool 124 of the first-second gear position changeover valve 117. The first-second gear position changeover valve 117 is a valve by which the destination of supply of the working oil supplied from the side of the linear solenoid valve 114 is set to either of the first gear position oil hydraulic type multiple disk clutch 44 and a second-third gear position changeover valve 119, according to the position of the spool driven by the oil pressure of the first-second gear position changeover solenoid 116.

The first-second gear position changeover solenoid 116 connects the oil pressure when the power source is OFF, and interrupts the oil pressure when the power source is ON. When the power source is OFF, the spool 124 in the first-second gear position changeover valve 117 moves leftward in the figure, against an elastic force of a coil spring 125 provided inside. When the power source is ON, the oil pressure is disconnected, and the spool 124 in the first-second gear position changeover valve 117 is moved in the direction reverse to the above by the elastic force of the coil spring 125.

A second-third gear position changeover solenoid 118 is a valve for connection/disconnection of an oil pressure for driving a spool of the second-third gear position changeover valve 119. The second-third gear position changeover valve 119 is a valve by which the destination of supply of the working oil supplied from the side of the first-second gear position changeover valve 117 is set to either of the second gear position oil hydraulic type multiple disk clutch 65 or the third gear position oil hydraulic type multiple disk clutch 66, according to the position of a spool driven by the oil pressure of the second-third gear position changeover solenoid 118.

The second-third gear position changeover solenoid 118 also connects the oil pressure when the power source is OFF, and interrupts the oil pressure when the power source is ON. The constitution of the spool and a coil spring in the second-third gear position changeover valve 119 is the same as in the first-second gear position changeover valve 117.

An oil pressure control valve 120 and an oil pressure control valve 121 are valves for controlling the discharge of a return oil from the oil hydraulic type multiple disk clutch that is not used. Each of them is provided therein with a spool and a coil spring, and is driven by the oil pressure.

In FIG. 8, the oil passage ends denoted by symbol X are outlets for the return oil. The return oil is discharged through these outlets to the exterior of the valve body 90, is mixed with the return oil from other routes, and a portion of the mixed return oil is fed through an oil tank, an oil pump, and an oil filter again to the valve body 90, to be utilized in a circulated manner.

Figure 9:
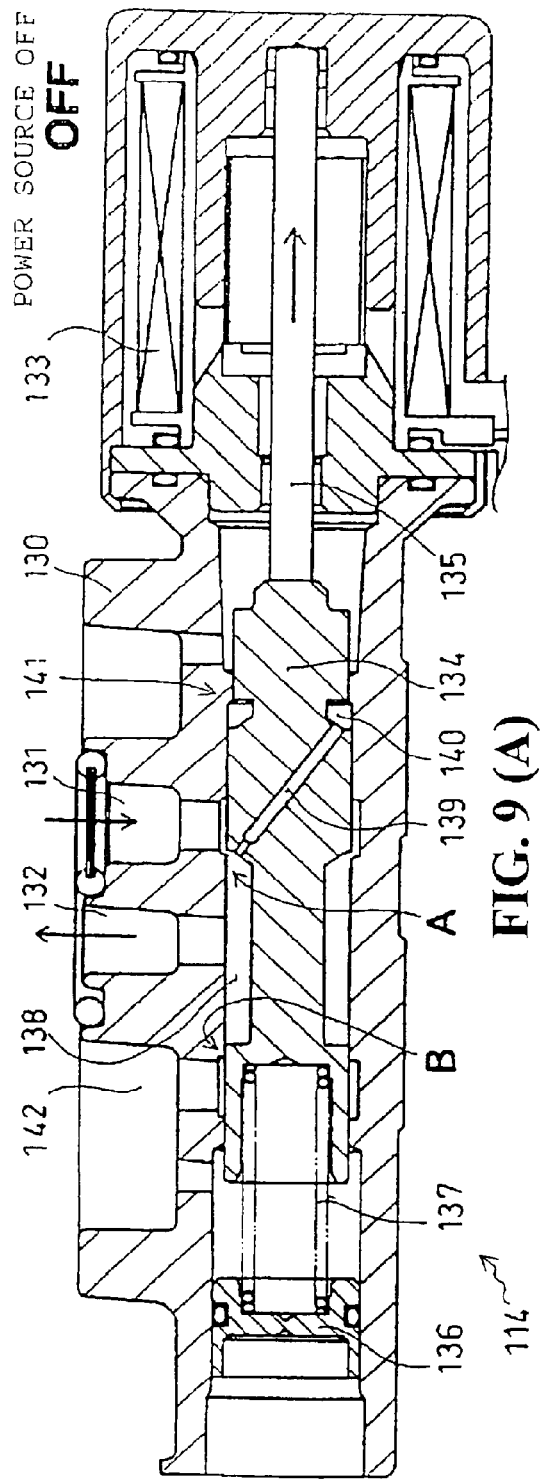
Figure 9:
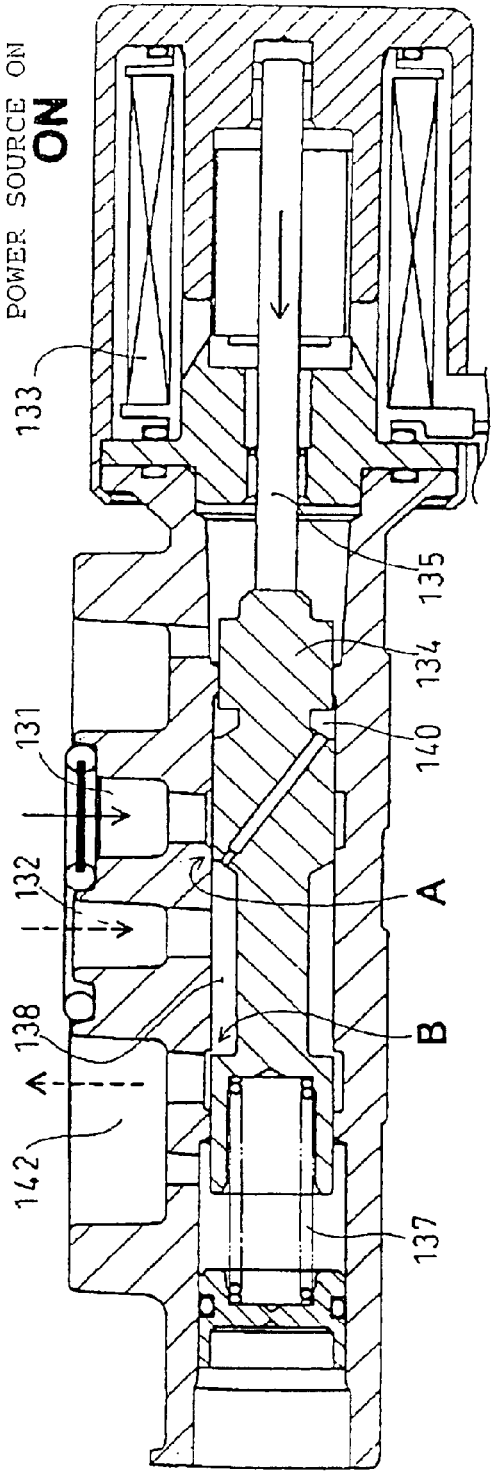

FIGS. 9(a) and (b) show enlarged sectional views of the above-mentioned linear solenoid valve 114. FIG. 9(a) shows the condition where the power source is OFF (working oil supply condition), and FIG. 9(b) shows the condition where the power source is ON (working oil interruption condition). In these figures, a valve main body 130 is provided with a working oil inlet 131 and a working oil outlet 132, and a solenoid 133 is connected to an end portion of the valve main body 130. A spool 134 is slidably fitted in a center hole of the main body 130, and a rod-like body 135 connected integrally to the spool 134 is passed through a central portion of the solenoid 133. The spool 134 is energized toward the solenoid 133 by a coil spring 137 fitted between an end portion of the spool 134 and a cover 136.

When the power source is OFF (FIG. 9(a)), the spool 134 and the rod-like body 135 connected thereto are retracted to the right side by an elastic force of the coil spring 137. At this time, a little communication portion is present at an adjacent portion A of the working oil inlet 131 provided in the valve main body and an annular groove 138 formed at the outer periphery of the spool. The working oil flows through this portion into the annular groove 138, is fed out through the working oil outlet 132 toward the emergency valve 115, and is supplied to a predetermined oil hydraulic type multiple disk clutch. At this time, the oil pressure inside the annular groove 138 is exerted on the working oil filling a slant hole 139 and an annular small chamber 140. The annular small chamber 140 is defined by an inside diameter stepped portion 141 of the main body 130 and an outer diameter step of the spool 134, so that a thrust force directed leftwards in the figure is exerted on the spool 134.

When the power source is ON (FIG. 9(b)), a leftward thrust force is exerted on the rod-like body 135 by an electromagnetic force of the solenoid 133. A resultant force of this thrust force and the thrust force generated in the annular small chamber 140 causes the rod-like body 135 and the spool 134 to move leftwards in the figure against the elastic force of the coil spring 137. At this time, a small communication portion is generated in an adjacent portion B of the annular groove 138 of the spool 134 and a working oil discharge port 142 provided in the main body 130. The working oil in the annular groove 138 and the return oil having passed through the working oil outlet 132 are discharged through the communication portion, whereby the oil pressure is lowered. The oil pressure in the annular small chamber 140 is also lowered, so that the thrust force pushing the spool 134 leftwards is also reduced.

Since the linear solenoid valve 114 is constituted as above, when the output oil pressure is raised due to the balance between the pressure on the back side of the valve and the thrust force of the solenoid, the pressure on the back side of the valve is also raised, to close the valve, thereby disconnecting the oil pressure. With the oil pressure disconnected, the pressure on the back side of the valve is lowered, so that the valve is opened. These are repeated, whereby a constant oil pressure is outputted. In addition to this, the thrust force of the solenoid is varied by a current value, whereby the output oil pressure can be varied linearly. With this configuration, the pressure of the working oil supplied to the clutch can be increased gradually.

The valve body 90 controls the supply and the connection/disconnection of the working oil to the oil hydraulic type multiple disk clutch by combinations of the ON/OFF conditions of the power sources applied to the three solenoids. FIG. 10 is an operation table of the three solenoids, and shows the ON/OFF conditions of the power sources applied to the solenoids, for the neutral position, the first gear position, the second gear position, the third gear position, and the back gear position in the operating conditions of the vehicle.

The flow conditions of the working oil in each of the operating conditions are shown in FIGS. 11 to 15. In FIGS. 11 to 15, the oil passages in which a thick solid line is drawn are oil passages in which the oil pressure is exerted on the working oil. The oil passages in which a chain line is drawn are oil passages of the return oil having a lowered oil pressure. The blank oil passages are oil passages that are not active.

Figure 11:
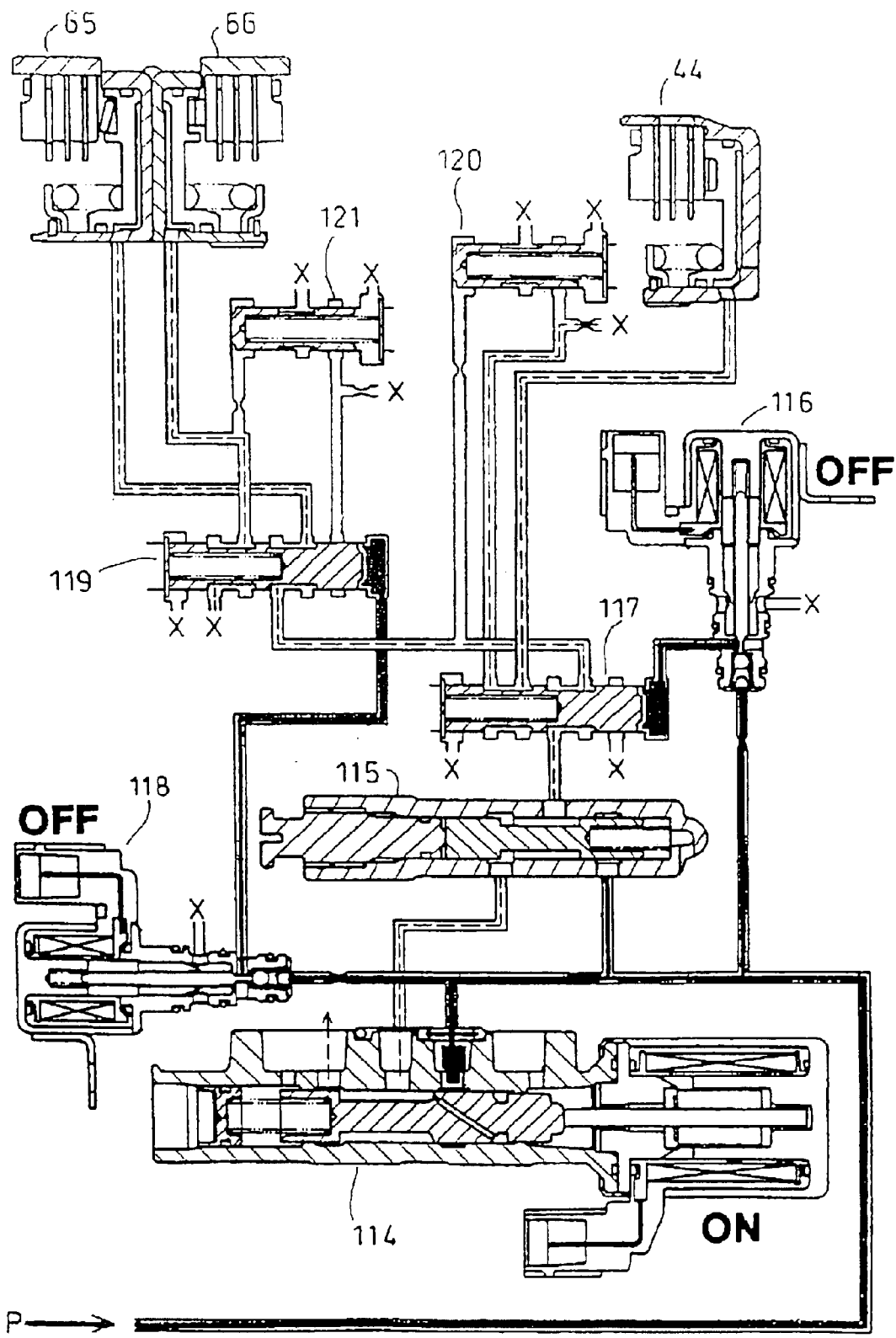
FIG. 11 is an oil pressure control system chart in the neutral condition.

When the vehicle is stopped in an idling condition, each of the solenoids is set in the neutral position in FIG. 10. At this time, the power source is ON at the linear solenoid valve 114, and a current of 1 amp flows through the solenoid. Since the flow of the working oil is interrupted, as shown in FIG. 11, supply of the working oil to the oil hydraulic type multiple disk clutch is not conducted, so that creep would not be generated.

Figure 12:
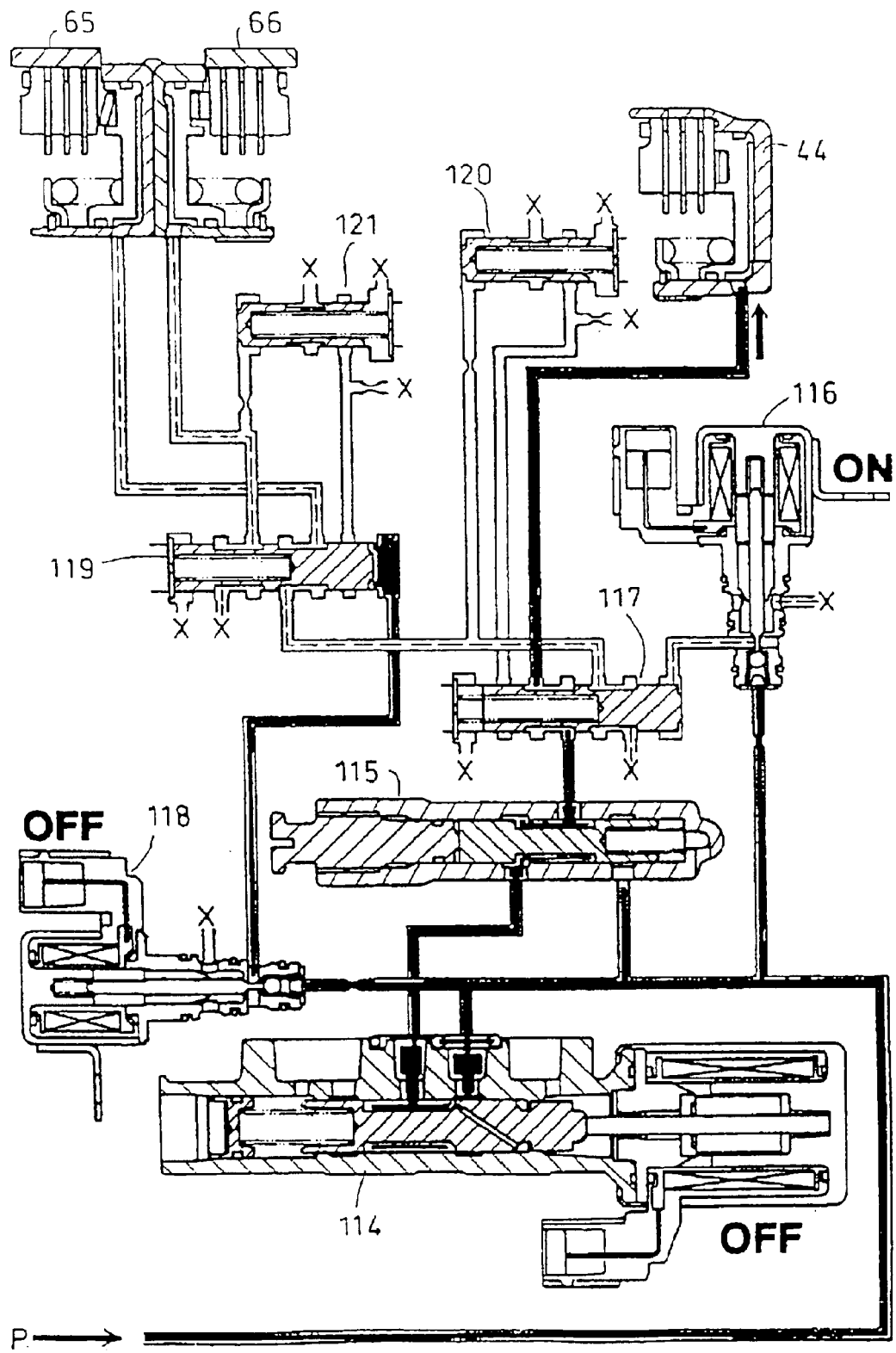
FIG. 12 is an oil pressure control system chart in the case where the power source is OFF in the first gear position condition and the backward running condition.
Figure 13:
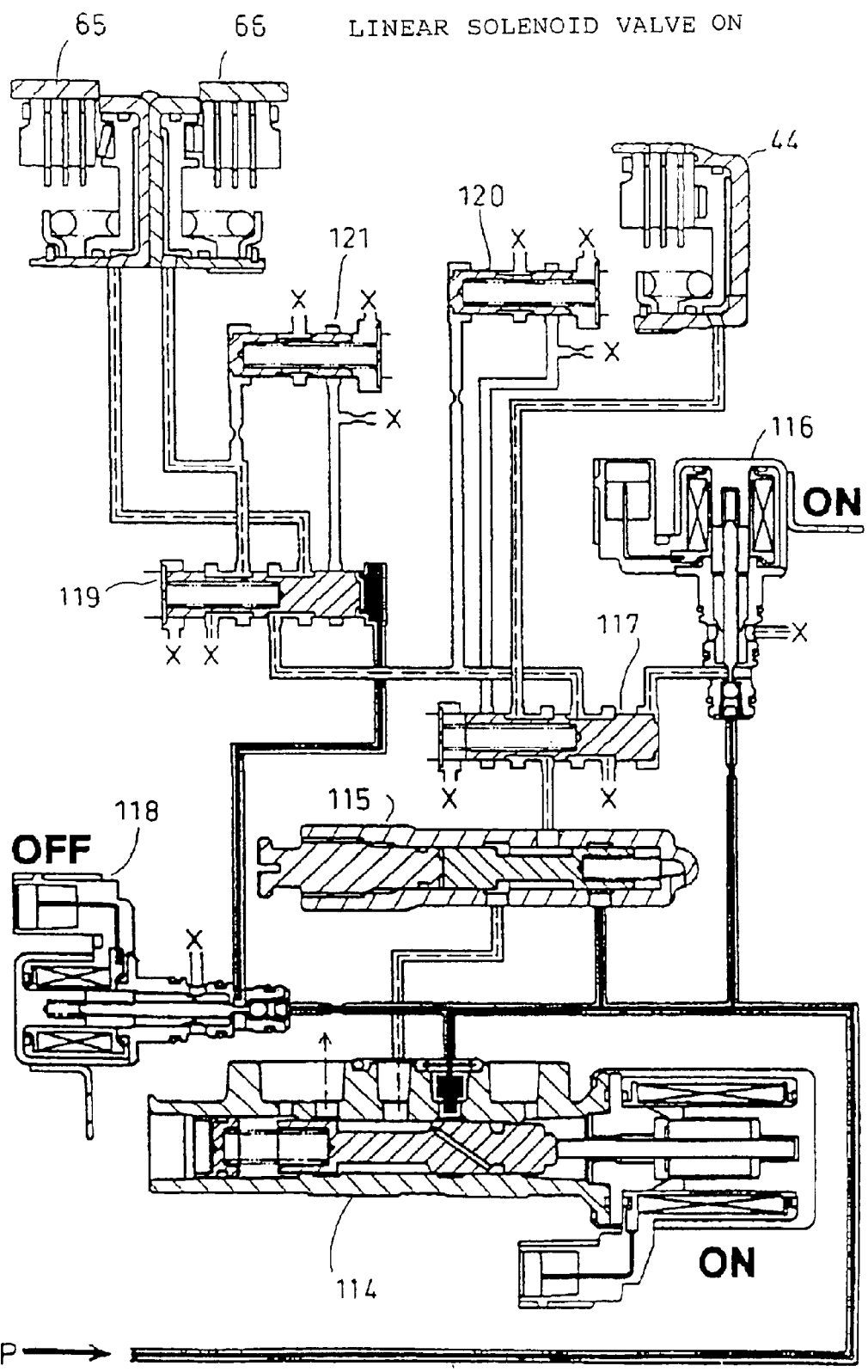
FIG. 13 is an oil pressure control system chart in the case where the power source is ON in the first gear position condition and the backward running condition.

When the operation of the vehicle is switched to the first gear position or the back gear position, the working oil is supplied to the first gear position oil hydraulic type multiple, disk clutch 44. Particularly in the case of changeover from the stopped condition to the first gear position or the back gear position, a gradual clutch connection is required. Therefore, the power source applied to the solenoid repeats OFF/ON. The condition where the power source is OFF corresponds to the supply of the working oil as shown in FIG. 12, while the condition where the power source is ON corresponds to the interruption of the working oil as shown in FIG. 13. In this case, the current applied when the power source is ON is as little as 0.2 amp, which is ⅕ of the current value at the time of the neutral position, so that the thrust force due to the electromagnetic force exerted on the spool is weak. When the spool 134 is advanced with the power source being ON (FIG. 9(b)), the oil pressure is released from the communication portion B, and the pressure inside the annular small chamber 140 is also lowered, so that it becomes easier for the spool 134 to be retracted by the elastic force of the coil spring 137.

By repeating the OFF/ON conditions of the power source at minute time intervals, a gradual supply of the working oil and a gradual clutch connection can be achieved. For the gradual supply of the working oil, the ratio and the continuation times of the OFF/ON conditions of the power source are controlled, with increases in the throttle opening and the internal combustion engine revolution frequency as parameters.

Figure 14:
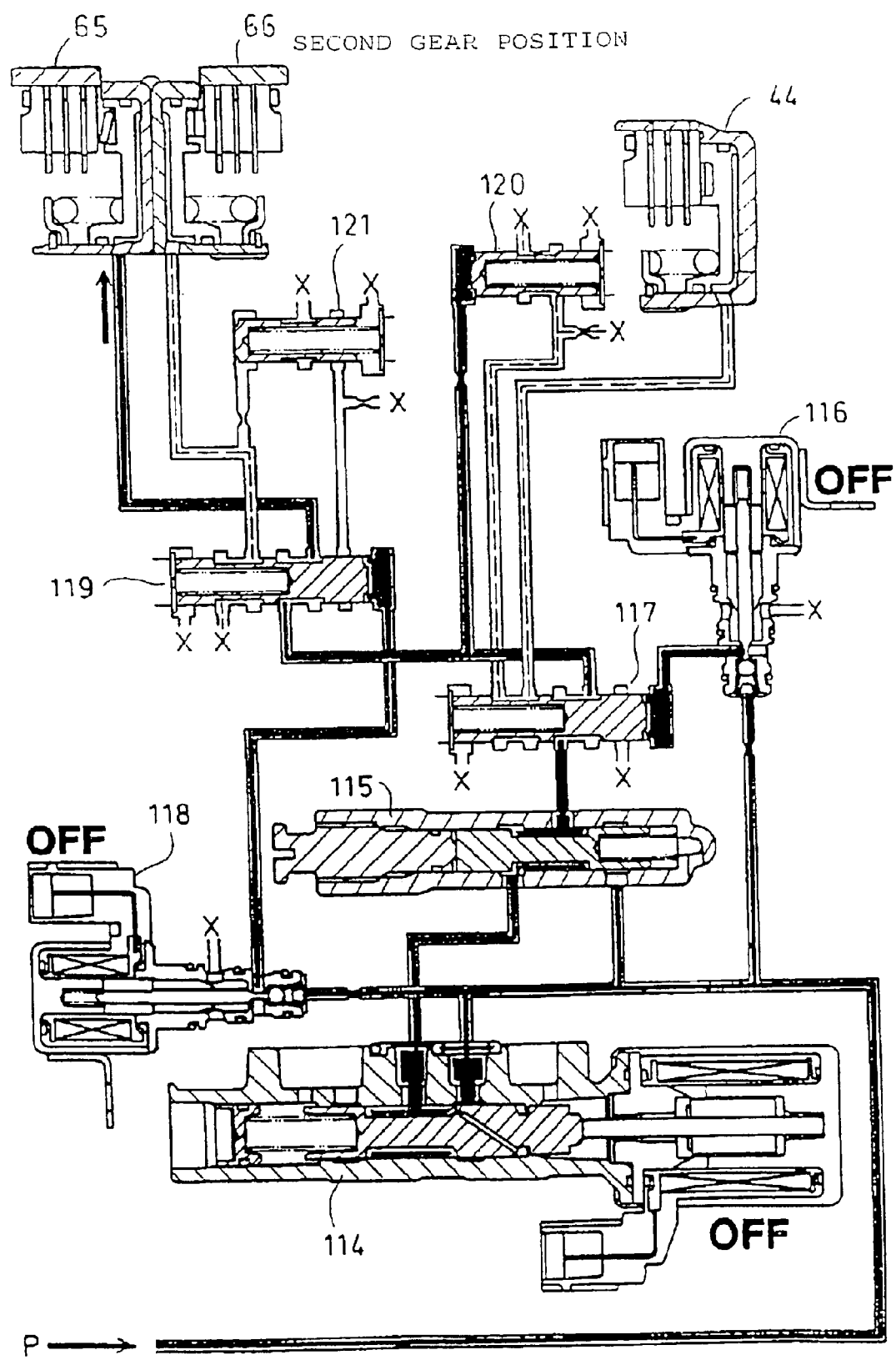
FIG. 14 is an oil pressure control system chart in the second gear position condition.
Figure 15:
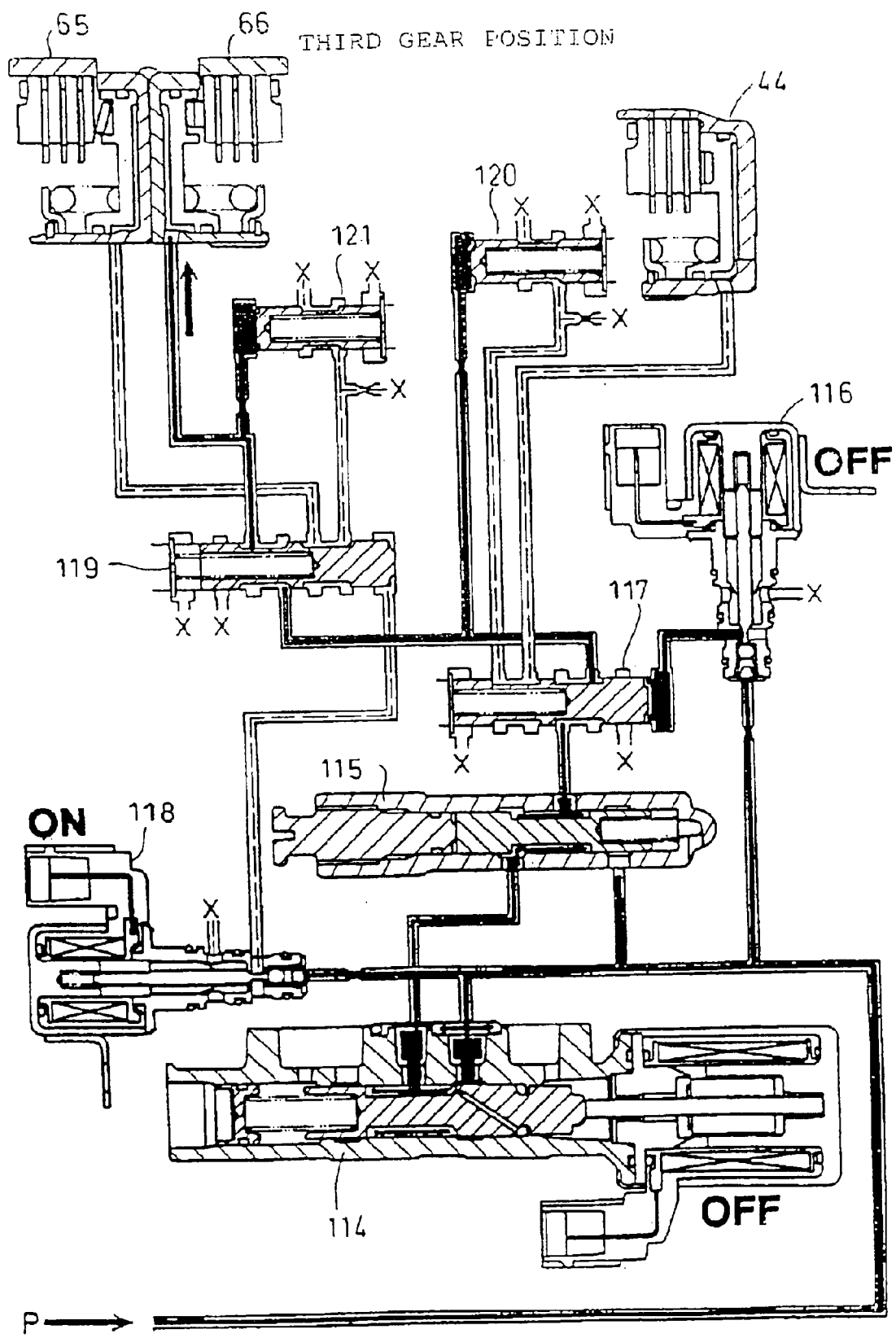
FIG. 15 is an oil pressure control system chart in the third gear position condition.

When the operation of the vehicle is switched to the second gear position or the third gear position, the working oil is supplied to the second gear position oil hydraulic type multiple disk clutch 65 or the third gear position oil hydraulic type multiple disk clutch 66. The supply conditions of the working oil at these times are shown in FIGS. 14 and 15, respectively.

Figure 16:
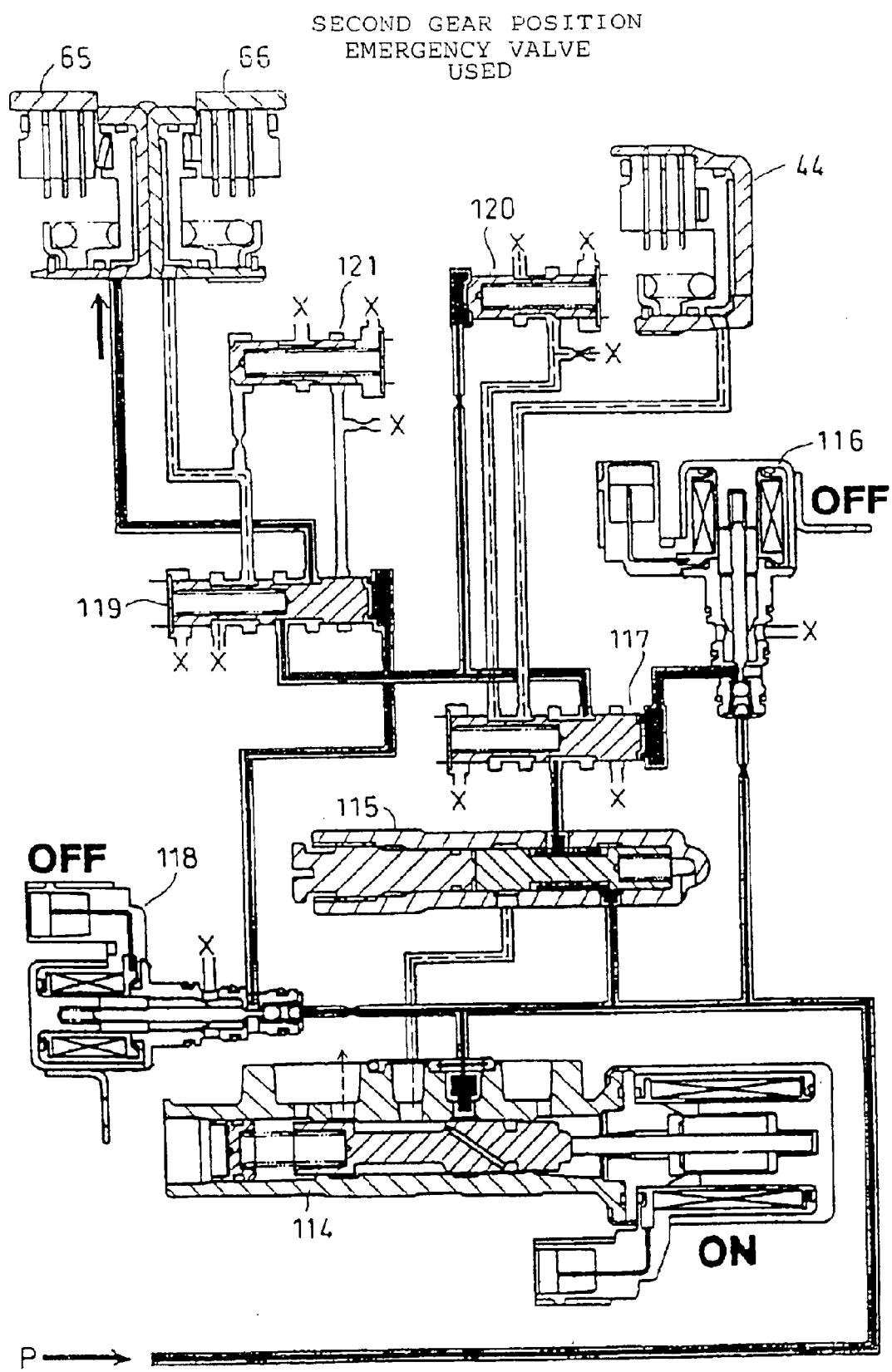
FIG. 16 is an oil pressure control system chart in the case where the second gear position operation is conducted by setting an emergency valve when the linear solenoid valve is failed in the working oil interruption condition.

In the present embodiment, the linear solenoid valve 114 is provided at the inlet portion of the oil pressure system. Therefore, a mechanism is needed to overcome a failed condition or stoppage of the linear solenoid valve 114 in the working oil disconnection condition (power source ON). The mechanism provided to overcome such a failed linear solenoid valve 114 is the spool presser screw 122 of the emergency valve 115. The spool presser screw 122 can be manually screwed in to push the spool 123 into the inside, thereby forming an oil passage bypassing the linear solenoid valve 114, and acting to restart the operation. FIG. 16 shows an example of the oil pressure system upon the setting of the bypass oil passage as above. Specifically, FIG. 16 shows the oil pressure system in the case of operating in the second gear position, and where the emergency valve 115 is set upon failure of the linear solenoid valve 114 in the working oil disconnection condition.

In the present embodiment, in order to achieve creep prevention with respect to all the clutches, the linear solenoid valve for supplying the working oil and interrupting the supply of the working oil is disposed at a most upstream position in the oil pressure control mechanism. In the stand-by condition for starting, namely, in the idling stopped condition, the supply of the working oil to the clutches is interrupted. As a result, a creep preventive mechanism independent from a brake signal is obtained.

In the present invention, a system is adopted in which the supply of the working oil is gradually increased with increases in the throttle opening and the internal combustion engine revolution frequency as parameters at the times of first gear position starting and backward running. Since the emergency valve is provided for mechanically causing the working oil to flow, bypassing the linear solenoid valve when the linear solenoid valve is stopped and failed in the working oil interruption condition, the operation can be restarted even when there is a stoppage or failure in the working oil interruption condition.

Since the linear solenoid valve is provided at the most upstream position, the coping with the failure of the linear solenoid valve can be made independent from the running mode and be simplified. In addition, the operation of the solenoid valve is set for creep generation at the time when the power source is OFF, whereby the use of the emergency valve can be limited to the locking of the spool valve in the linear solenoid valve in the working oil interruption condition. As a result, the oil pressure system is simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil pressure control system for automatic transmission for a vehicle, comprising:
    an oil hydraulic clutch provided alongside each speed change gear of the transmission;
    an oil pressure supply source for said oil hydraulic clutch; and
    a linear solenoid valve provided between said oil pressure supply source and said oil hydraulic clutch for either supplying or interrupting a supply of a working oil,
    wherein said supply of said working oil to said clutch is interrupted when an internal combustion engine is in an idling condition and said vehicle is at stop,
    wherein said linear solenoid valve supplies said working oil when a power source is OFF, and interrupts the supply of said working oil when said power source is ON.

2. The oil pressure control valve for automatic transmission as set forth in claim 1, wherein said linear solenoid valve increases gradually an amount of said working oil supplied to said clutch, with increases in a throttle opening and an engine revolution frequency as parameters.

3. The oil pressure control valve for automatic transmission as set forth in claim 1, wherein said linear solenoid valve increases gradually the amount of said working oil supplied to said clutch, with increases in a throttle opening and an engine revolution frequency as parameters.

4. The oil pressure control valve for automatic transmission as set forth in claim 2, further comprising a communication passage in said linear solenoid valve, said communication passage for equalizing the pressure of said working oil supplied to said clutch and the oil pressure on a back side of said valve, wherein pressure of said working oil and the oil pressure on the back side of said valve is equalized when said working oil is supplied, and the oil pressure on the back side of said valve is released when the supply of said working oil is interrupted.

5. The oil pressure control valve for automatic transmission as set forth in claim 1, wherein a manual emergency valve capable of forming an oil passage bypassing said linear solenoid valve is provided on a side of a discharge port of said linear solenoid valve.

6. The oil pressure control valve for automatic transmission as set forth in claim 5, wherein said manual emergency valve includes a spool presser screw for displacing a spool, thereby forming said oil passage bypassing said linear solenoid valve.

7. The oil pressure control valve for automatic transmission as set forth in claim 1, wherein a current of one (1) amp is provided to said linear solenoid when said vehicle is in a stand-by condition for starting.

8. The oil pressure control valve for automatic transmission as set forth in claim 1, wherein a current of 0.2 amps is provided to said linear solenoid when a power source is ON.

9. An oil pressure control system for automatic transmission for a vehicle, comprising:

a plurality of oil hydraulic clutches provided alongside speed change gears of the transmission;

gear position changeover solenoids for connecting and disconnecting oil pressure of gear position changeover valves corresponding to said plurality of oil hydraulic clutches;

an oil pressure supply source for said plurality of oil hydraulic clutches; and a linear solenoid valve provided between said oil pressure supply source and said gear position changeover valves for either supplying or interrupting a supply of a working oil, wherein said supply of said working oil to said plurality of oil hydraulic clutches is interrupted when an internal combustion engine is in an idling condition and said vehicle is at stop, wherein said linear solenoid valve supplies said working oil when a power source is OFF, and interrupts the supply of said working oil when said power source is ON.

10. The oil pressure control system for automatic transmission as set forth in claim 9, wherein said linear solenoid valve increases gradually the amount of said working oil supplied to said plurality of clutches, with increases in a throttle opening and an engine revolution frequency as parameters.

11. The oil pressure control system for automatic transmission as set forth in claim 9, wherein said linear solenoid valve increases gradually the amount of said working oil supplied to said plurality of clutches, with increases in a throttle opening and an engine revolution frequency as parameters.

12. The oil pressure control system for automatic transmission as set forth in claim 10, further comprising a communication passage in said linear solenoid valve, said communication passage for equalizing the pressure of said working oil supplied to said clutch and the oil pressure on a back side of said valve, wherein pressure of said working oil and the oil pressure on the back side of said valve is equalized when said working oil is supplied, and the oil pressure on the back side of said valve is released when the supply of said working oil is interrupted.

13. The oil pressure control system for automatic transmission as set forth in claim 9, wherein a manual emergency valve capable of forming an oil passage bypassing said linear solenoid valve is provided on a side of a discharge port of said linear solenoid valve.

14. The oil pressure control system for automatic transmission as set forth in claim 12, wherein said manual emergency valve includes a spool presser screw for displacing a spool, thereby forming said oil passage bypassing said linear solenoid valve.

15. The oil pressure control system for automatic transmission as set forth in claim 9, wherein a current of one (1) amp is provided to said linear solenoid when said vehicle is in a stand-by condition for starting.

16. The oil pressure control valve for automatic transmission as set forth in claim 9, wherein a current of 0.2 amps is provided to said linear solenoid when a power source is ON.

* * * * *